(12) United States Patent
Higley et al.

(10) Patent No.: US 11,940,654 B2
(45) Date of Patent: Mar. 26, 2024

(54) SMALL FORM FACTOR CONNECTOR AND ADAPTER

(71) Applicant: US Conec, Ltd., Hickory, NC (US)

(72) Inventors: Jason Higley, Hickory, NC (US); Darrell R. Childers, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 18/456,105

(22) Filed: Aug. 25, 2023

(65) Prior Publication Data

US 2023/0400642 A1    Dec. 14, 2023

Related U.S. Application Data

(63) Continuation of application No. 18/299,278, filed on Apr. 12, 2023, now Pat. No. 11,768,333, which is a continuation of application No. 17/426,051, filed as application No. PCT/US2020/015858 on Jan. 30, 2020.

(60) Provisional application No. 62/798,699, filed on Jan. 30, 2019.

(51) Int. Cl.
*G02B 6/38* (2006.01)

(52) U.S. Cl.
CPC ......... *G02B 6/3831* (2013.01); *G02B 6/3825* (2013.01); *G02B 6/3877* (2013.01); *G02B 6/3879* (2013.01)

(58) Field of Classification Search
CPC .................................... G02B 6/38; G02B 6/00
USPC ........................................................ 385/139
See application file for complete search history.

(56) References Cited

U.S. PATENT DOCUMENTS

| 4,960,317 | A | * | 10/1990 | Briggs | G02B 6/3897 385/56 |
| 5,619,604 | A | * | 4/1997 | Shiflett | G02B 6/3869 385/55 |
| 5,737,463 | A | | 4/1998 | Weiss et al. | |
| 6,017,154 | A | * | 1/2000 | Carlisle | G02B 6/3869 385/86 |
| 6,019,521 | A | | 2/2000 | Manning et al. | |
| 6,352,373 | B1 | | 3/2002 | Yamaguchi | |

(Continued)

FOREIGN PATENT DOCUMENTS

| EP | 1337883 B1 | 9/2004 |
| JP | 2020046582 A * | 3/2020 |

(Continued)

OTHER PUBLICATIONS

FOCIS 10 Fiber Optic Connector Intermateability Standard—Type LC, Mar. 6, 2002, 38 pages.

(Continued)

*Primary Examiner* — Kaveh C Kianni
(74) *Attorney, Agent, or Firm* — NK Patent Law

(57) ABSTRACT

A two-piece fiber optic connector and a corresponding two-piece adapter allow for the tripling of the optical fibers that can be used with a standard fiber-optic cassette. The two-piece fiber optic connector has a fold-over latch to engage the adapter. The two-piece adapter has at least one latch to engage the standard fiber-optic cassette to retain the two-piece adapter and the fiber optic connectors in the adapter within the cassette. This allows for the retrofitting and/or continued use of the standard fiber-optic cassette.

20 Claims, 19 Drawing Sheets

(56) References Cited

U.S. PATENT DOCUMENTS

| | | | |
|---|---|---|---|
| 6,422,760 B1 * | 7/2002 | Matasek | G02B 6/3885 385/60 |
| 6,513,989 B1 * | 2/2003 | Bleck | G02B 6/3897 385/60 |
| 7,281,859 B2 | 10/2007 | Mudd et al. | |
| 8,690,593 B2 * | 4/2014 | Anderson | G02B 6/3807 439/660 |
| 9,720,183 B2 * | 8/2017 | Dalton | G02B 6/3825 |
| 9,804,337 B2 | 10/2017 | Anderson et al. | |
| 9,857,538 B2 * | 1/2018 | Nguyen | G02B 6/3825 |
| 10,156,684 B2 | 12/2018 | Nguyen et al. | |
| 10,191,227 B2 * | 1/2019 | Lee | G02B 6/4453 |
| 10,191,230 B2 | 1/2019 | Wong et al. | |
| 10,222,556 B2 * | 3/2019 | Nguyen | G02B 6/3879 |
| 10,281,668 B2 | 5/2019 | Takano et al. | |
| 10,281,669 B2 * | 5/2019 | Takano | G02B 6/3893 |
| 10,527,802 B2 | 1/2020 | Wong et al. | |
| 10,585,247 B2 * | 3/2020 | Takano | G02B 6/403 |
| 10,677,996 B2 | 6/2020 | Aoshima et al. | |
| 10,901,155 B2 * | 1/2021 | Lu | G02B 6/3893 |
| 11,016,250 B2 | 5/2021 | Higley et al. | |
| 11,016,251 B2 | 5/2021 | Childers et al. | |
| 11,112,567 B2 | 9/2021 | Higley et al. | |
| 11,525,965 B2 | 12/2022 | Childers et al. | |
| 2009/0227133 A1 * | 9/2009 | Zhang | H01R 13/6583 439/160 |
| 2010/0008635 A1 * | 1/2010 | Zimmel | G02B 6/3825 385/136 |
| 2010/0220961 A1 | 9/2010 | Jong et al. | |
| 2014/0133820 A1 * | 5/2014 | Zimmel | G02B 6/29382 385/135 |
| 2014/0169727 A1 * | 6/2014 | Veatch | G02B 6/3879 385/11 |
| 2015/0030289 A1 | 1/2015 | Jiang et al. | |
| 2015/0177463 A1 * | 6/2015 | Lee | G02B 6/3879 385/76 |
| 2015/0191024 A1 | 7/2015 | Heath et al. | |
| 2016/0161680 A1 * | 6/2016 | Nguyen | G02B 6/3825 385/59 |
| 2016/0238796 A1 | 8/2016 | Nguyen et al. | |
| 2016/0306125 A1 * | 10/2016 | Wu | G02B 6/3879 |
| 2016/0327757 A1 | 11/2016 | Lee | |
| 2017/0139430 A1 | 5/2017 | Gledhill, III et al. | |
| 2017/0205588 A1 * | 7/2017 | Lee | G02B 6/3825 |
| 2017/0299818 A1 | 10/2017 | Chang et al. | |
| 2017/0343740 A1 | 11/2017 | Nguyen | |
| 2018/0252872 A1 | 9/2018 | Chen | |
| 2019/0018201 A1 | 1/2019 | Takano et al. | |
| 2019/0126333 A1 | 5/2019 | Krystian | |
| 2019/0195652 A1 | 6/2019 | Lafon | |
| 2019/0278028 A1 | 9/2019 | Higley | |
| 2019/0384017 A1 * | 12/2019 | Lu | G02B 6/3882 |
| 2019/0391343 A1 * | 12/2019 | Aoshima | G02B 6/3879 |
| 2020/0150357 A1 | 5/2020 | Higley et al. | |
| 2020/0160254 A1 | 5/2020 | Goyal | |
| 2020/0284998 A1 | 9/2020 | Higley et al. | |
| 2020/0285001 A1 | 9/2020 | Childers et al. | |
| 2020/0301077 A1 | 9/2020 | Leigh et al. | |
| 2020/0371299 A1 | 11/2020 | Gniadek et al. | |
| 2021/0149124 A1 | 5/2021 | Higley et al. | |
| 2021/0278609 A1 | 9/2021 | Childers et al. | |
| 2021/0405302 A1 | 12/2021 | Higley et al. | |
| 2022/0107467 A1 | 4/2022 | Higley | |
| 2023/0096618 A1 | 3/2023 | Childers et al. | |

FOREIGN PATENT DOCUMENTS

| | | | |
|---|---|---|---|
| JP | 2020046582 A | 3/2020 | |
| WO | 0242818 A1 | 5/2002 | |
| WO | 2006028814 A1 | 3/2006 | |
| WO | WO-2006028814 A1 * | 3/2006 | G02B 6/3897 |
| WO | 2015191024 A1 | 12/2015 | |
| WO | 2017139430 A1 | 8/2017 | |
| WO | 2019195652 A1 | 10/2019 | |
| WO | 2020160254 A1 | 8/2020 | |

OTHER PUBLICATIONS

International Search Report and Written Opinion PCT/US2018/066523 dated Mar. 5, 2019, 8 pages.

International Search Report and Written Opinion in PCT/US2020/015858, dated May 28, 2020, 11 pages.

Office Action in Chinese patent App. No. 2020800118295 dated Oct. 8, 2022, 15 pages.

Supplementary European Search report in corresponding European Patent App. No. 20749424.6 dated Sep. 7, 2022, 12 pages.

ISA/KR, International Search Report and Written Opinion for corresponding PCT Patent Application No. PCT/US2020/015858 dated May 28, 2020, 11 pages.

USPTO, Non-Final Office Action for corresponding U.S. Appl. No. 18/299,278, dated Jun. 20, 2023, 11 pages.

\* cited by examiner

SMALL FORM FACTOR CONNECTOR AND ADAPTER

REFERENCE TO RELATED CASE

This application is a continuation of U.S. Nonprovisional patent application Ser. No. 18/299,278 filed on Apr. 12, 2023, which is a continuation of U.S. Nonprovisional patent application Ser. No. 17/426,051 filed on Jul. 27, 2021, which claims priority to US PCT Patent Application No. PCT/US20/15858 filed on Jan. 30, 2020, which further claims priority to U.S. provisional application No. 62/798,699 filed on Jan. 30, 2019, the contents of all of which are hereby incorporated by reference in their entirety.

BACKGROUND OF THE INVENTION

Adapters are used in a variety of applications to align and mate fiber optic connectors that are inserted on opposite sides of the adapters. One of the design parameters for adapters is the footprint of the adapters used with the panel or backplane. With the requirements of a higher connection density per panel, smaller and smaller adapters are being introduced.

One example where smaller form factor adapters are used is with fiber optic cassettes. Fiber optic cassettes have input ports where duplex LC connectors are inserted. These are then multiplexed into multi-fiber connectors (e.g., MPO connectors) for further optical transport. Cassettes have limited internal space to route optical fibers that receive the optical input from external duplex or other connectors. Currently, a single adapter used with the fiber optic cassettes can only accommodate only two LC connectors meaning that only two optical fibers can be routed through that space. Given that there are 6 spaces, this limits a fiber optic cassette to routing only 12 fibers.

In order to allow for a higher density, a new adapter has been designed that allows for a tripling of the number of optical fibers (and fiber optic connectors) that can be accommodated in a fiber optic cassette. The design allows for the installation of new fiber optic cassettes but also allows for the retrofitting of the already-installed cassettes. A corresponding fiber optic connector has also been designed that is compatible with the new adapter and provides other advantages, such as reducing the areas of snagging of optical fibers that are inherent in the LC connector design.

SUMMARY OF THE INVENTION

The present invention is directed to a two-piece fiber optic connector that includes a first portion having at least two passageways to receive a fiber optic ferrule in each of the at least two passageways, a latch extending from a surface adjacent a rear portion of the first portion to removably engage an adapter, two side latches, each of the two latches disposed on a surface adjacent to the surface from which the latch extends and on opposite sides of the first portion, a second portion to receive a front portion of the first portion, and at least two side latch windows on the second portion to receive at least a portion of the two side latches to retain the first and second portions together.

In some embodiments, there are alignment shoulders on the first and second portions and they are configured to engage alignment projections projecting from walls in the adapter.

In some embodiments, the backplane adapter also includes at least one step alignment passageway to receive at least one alignment step on the fiber optic connector housing.

In other embodiments, the latch has a distal end and the distal end of the latch is disposed behind a blocking member.

In yet another aspect, the invention is directed to a two-piece adapter for mating fiber optic connectors on a fiber optic cassette body that includes a first portion to removably receive a plurality of fiber optic connectors in a first central opening, the first central opening having a plurality of alignment projections projecting from opposing walls, a central partition disposed within the first portion, the central partition having a first plurality of fiber optic ferrule openings, at least one latch to engage the fiber optic cassette body, a second portion attachable to the first portion, the second portion to removably receive a second plurality of fiber optic connectors in a second central opening, the central opening having a plurality of alignment projections projecting from opposing walls, and a second plurality of fiber optic ferrule openings to align with the first plurality of fiber optic ferrule openings.

In some embodiments, at least one of the second plurality of fiber optic connectors in the second central opening is a two-piece fiber optic connector attached to the second portion via a folded latch on a top or a bottom surface of one of the two pieces of the two-piece fiber optic connector.

In other embodiments, wherein the second portion includes a latch pocket to receive a portion of the at least one latch.

In yet another aspect, the present invention is directed to a combination of a two-piece adapter for receiving a two-piece fiber optic connector that includes a two-piece adapter that further includes a first piece configured to receive a plurality of fiber optic connectors in a first central opening and a second piece removably attachable to the first piece and configured to removably receive at least two fiber optic connectors to mate with a respective one of the plurality of fiber optic connectors in the first piece, the first piece including a latch to attach the two-piece adapter to a fiber optic cassette body and further includes a two-piece fiber optic connector that further includes a first portion having at least two passageways to receive a fiber optic ferrule in each of the at least two passageways, and a second piece attachable to the first piece via a side latch, the second piece having a folded latch on a top or a bottom surface thereof to engage a portion of the two-piece adapter, the folded latch extending from a rear end of the second piece toward the first piece and a distal end of the folded latch disposed behind a blocking surface.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
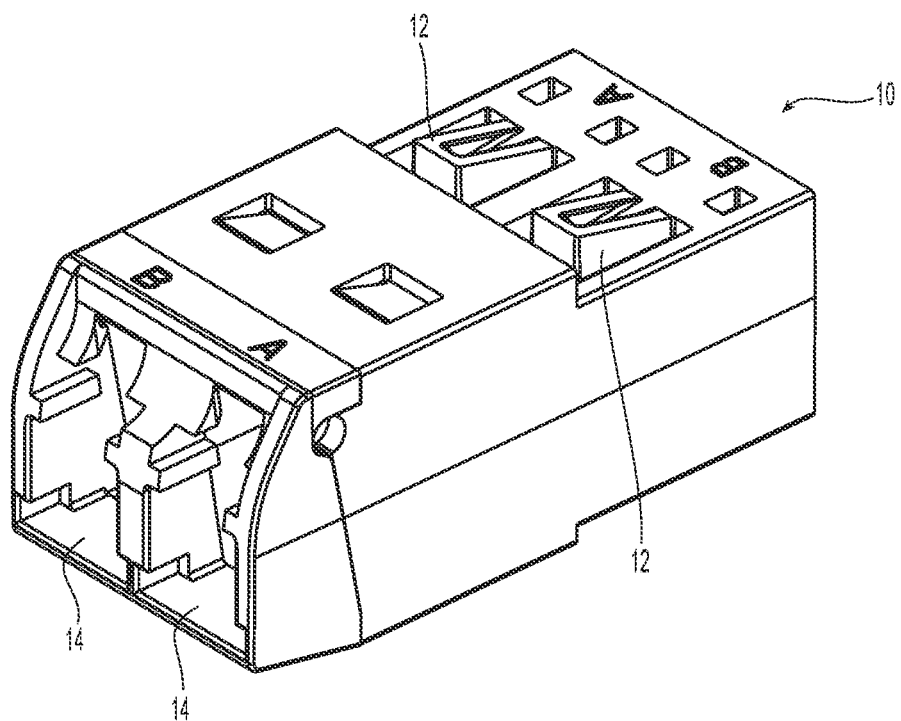
FIG. 1 is a front right side perspective view of a prior art cassette adapter with the input port side facing out.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
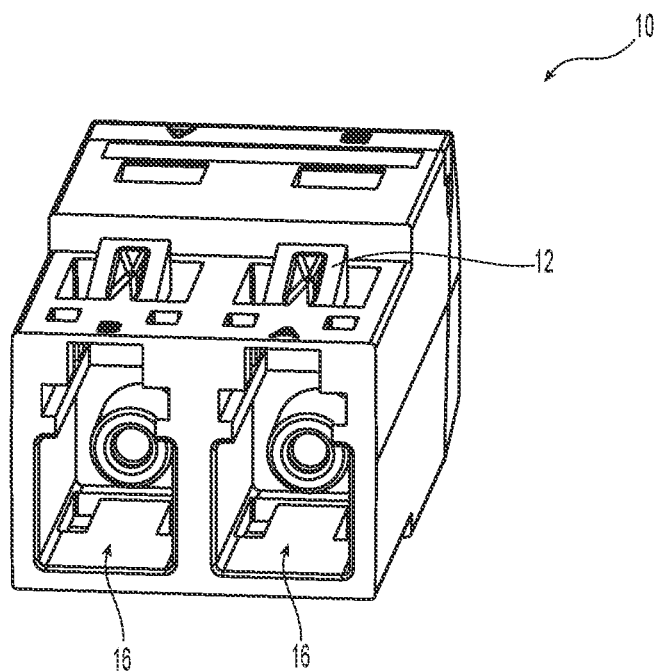
FIG. 2 is a rear perspective view of the prior art cassette adapter with the internal connector ports facing out.

FIGS. 1 and 2 illustrate a prior art adapter 10 that is used with fiber optic cassettes (not shown). The prior art adapters 10 are inserted into the fiber optic cassettes and are retained therein with the latches 12. There are two openings 14 in the front of the adapter 10 to receive a pair of connectors, usually having the LC configuration. See FIG. 1. Similarly, there are connectors that are inserted into the openings 16 in the back side of the adapter 10, to mate with the connectors inserted in the front. See FIG. 2. Optical fibers exit the back of the connectors in the back side of the adapter 10 and cross over the fiber optic cassette to be terminated in a different style connector, e.g., an MPO connector. However, the adapters 10 occupy a lot of space on the front of the fiber optic cassette for accommodating just two optical fibers. Thus, a new adapter and fiber optic connector are presented to triple the number of optical fibers that can be accommodated.

Figure 3:
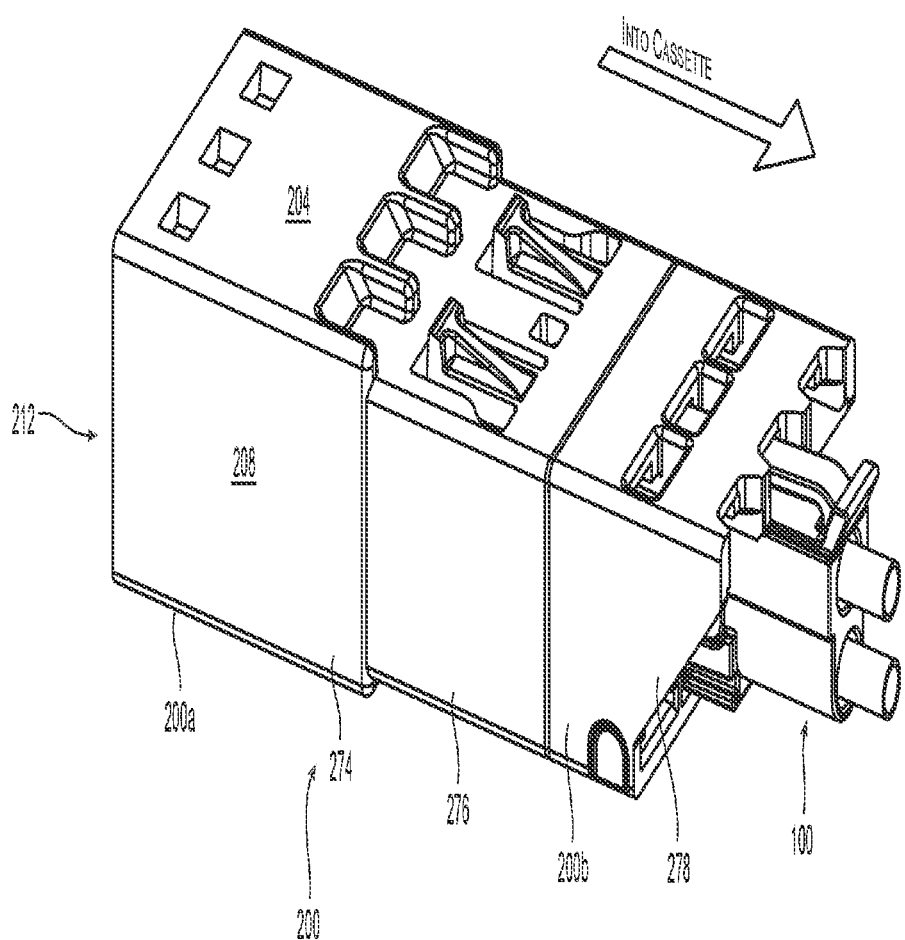
FIG. 3 is a right side perspective view of one embodiment of a two-piece fiber optic connector inserted into one embodiment of a two-piece adapter according to the present invention.
Figure 4:
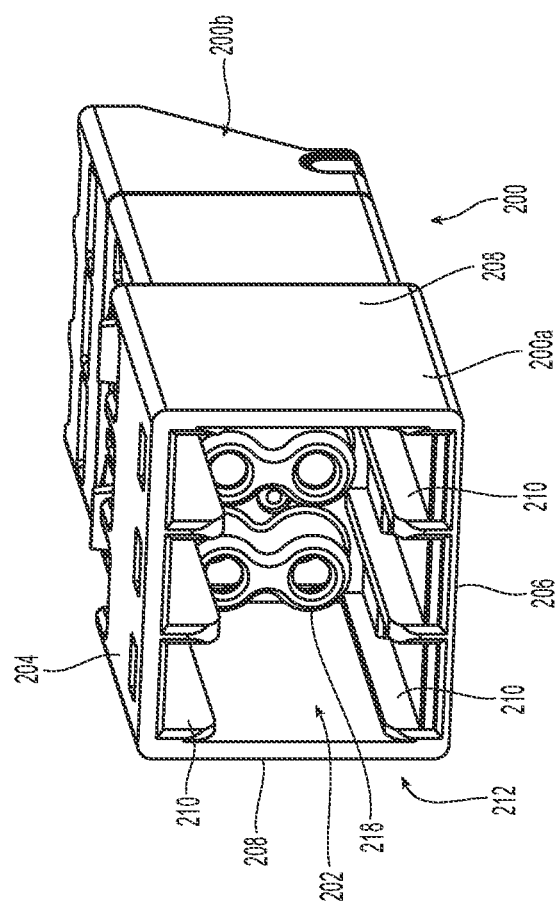
FIG. 4 is a front end perspective view of the two-piece adapter in FIG. 3.
Figure 5:
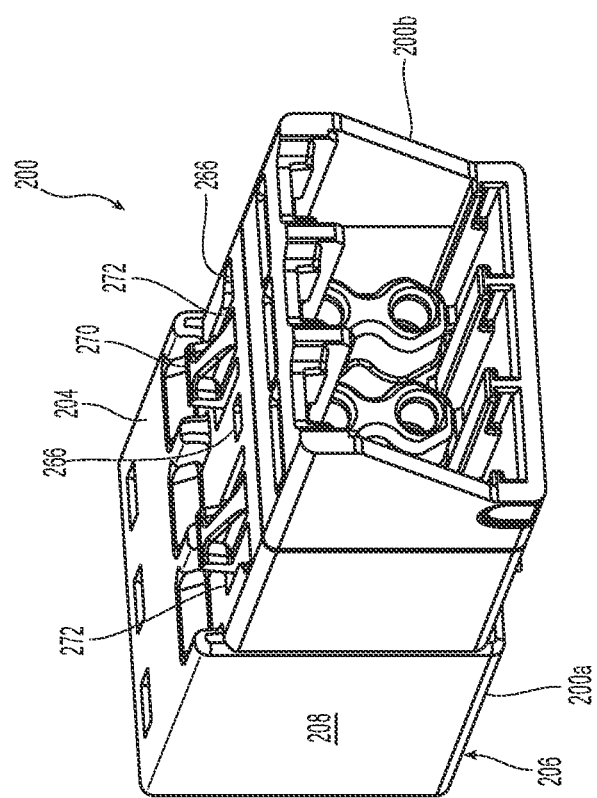
FIG. 5 is a rear end perspective view of the two-piece adapter in FIG. 3.

A first embodiment of a two-piece fiber optic connector 100 inserted into one embodiment of a two-piece adapter 200 according to the present invention is illustrated in FIG. 3. As will be recognized, the two-piece adapter 200 is inserted into the fiber optic cassette as illustrated by the arrow in FIG. 3. Thus, the two-piece fiber optic connector 100 would be inside the fiber optic cassette. As recognized from FIGS. 3-11C, the two-piece adapter 200 can receive three duplex fiber optic connectors (on both sides). Since the two-piece adapter 200 is the same size as that of adapter 10, this means the two-piece adapter 200 allows for a three-fold increase in the number of fiber optic connectors and optical fibers in the fiber optic cassette. The two-piece adapter 200 and the two-piece fiber optic connector 100 could also be used with a backplane, or a front panel of a server rack.

The two-piece adapter 200 has a first portion 200a and a second portion 200b. See, e.g., FIGS. 7 and 8. The first portion 200a has central opening 202 to removably receive a plurality of fiber optic connectors. The central opening 202 is formed by a top wall 204, a bottom wall 206, and two side walls 208 that extend from the top wall 204 to the bottom wall 206, as shown for example in FIG. 4. Extending into the central opening 202 from the top wall 204 to the bottom wall 206 are a number of alignment projections 210. The alignment projections 210 divide the central opening 202 into thirds and cooperate with alignment shoulders on the connectors inserted into the first portion 200a from outside of the fiber optic cassette. Such a fiber optic connector may be the MDC-type connector that is sold by Applicant, and disclosed for example in WIPO Publication No. WO/2019/195652, the contents of which are incorporated herein by reference in their entirety.

The alignment projections (on both sides as detailed below) may be the same as or similar to those discussed in Applicant's U.S. Pat. Nos. 9,857,538 and 10,156,684, for example, as well as in Applicant's pending patent application no. PCT/US18/66518 entitled "Mini Duplex Connector with Push-Pull Polarity and Carrier." The contents of these applications are incorporate herein by reference in their entirety.

Figure 6:
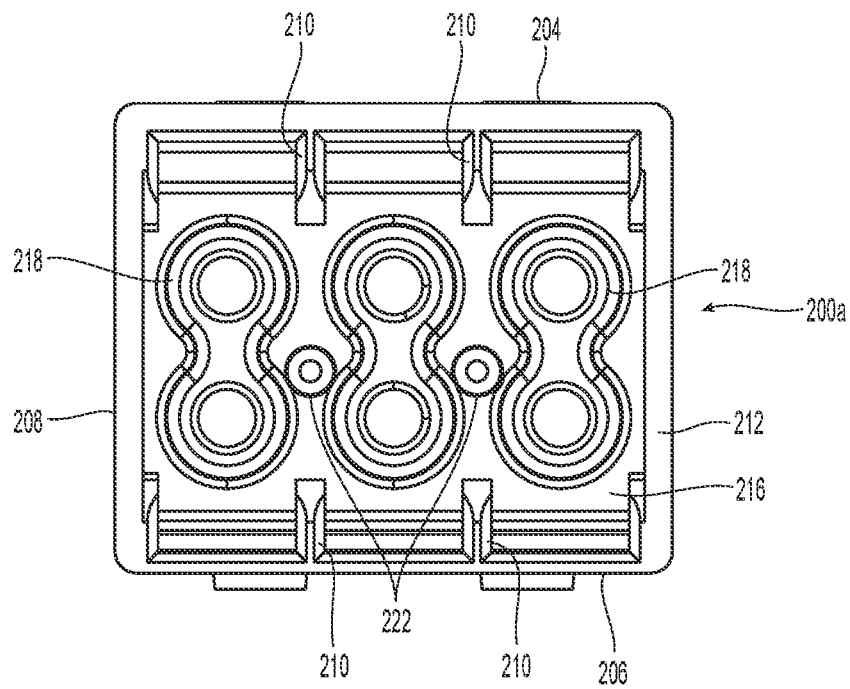
FIG. 6 is a front elevation view of a central partition in the first portion of the two-piece adapter in FIG. 3.
Figure 7:
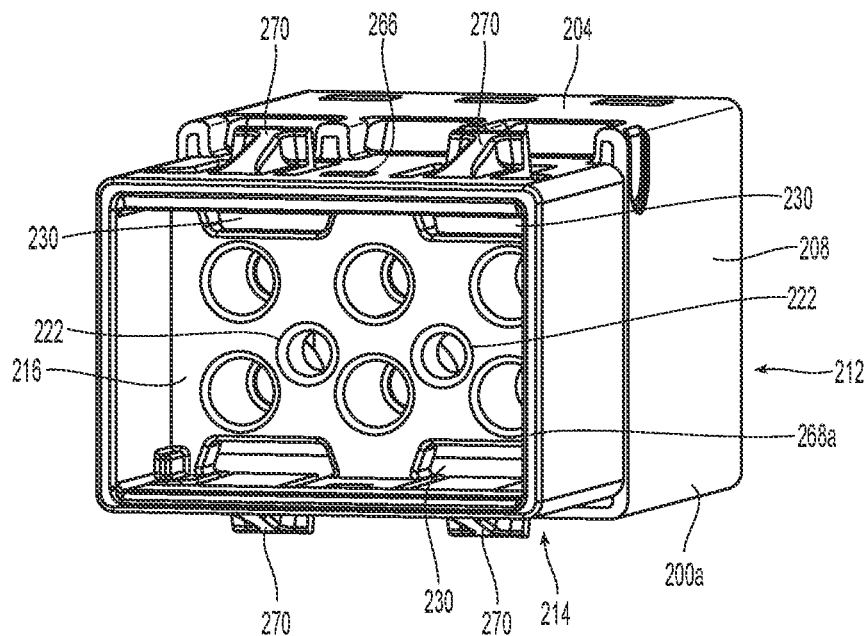
FIG. 7 is a rear perspective view of the first portion of the two-piece adapter in FIG. 3.
Figure 9:
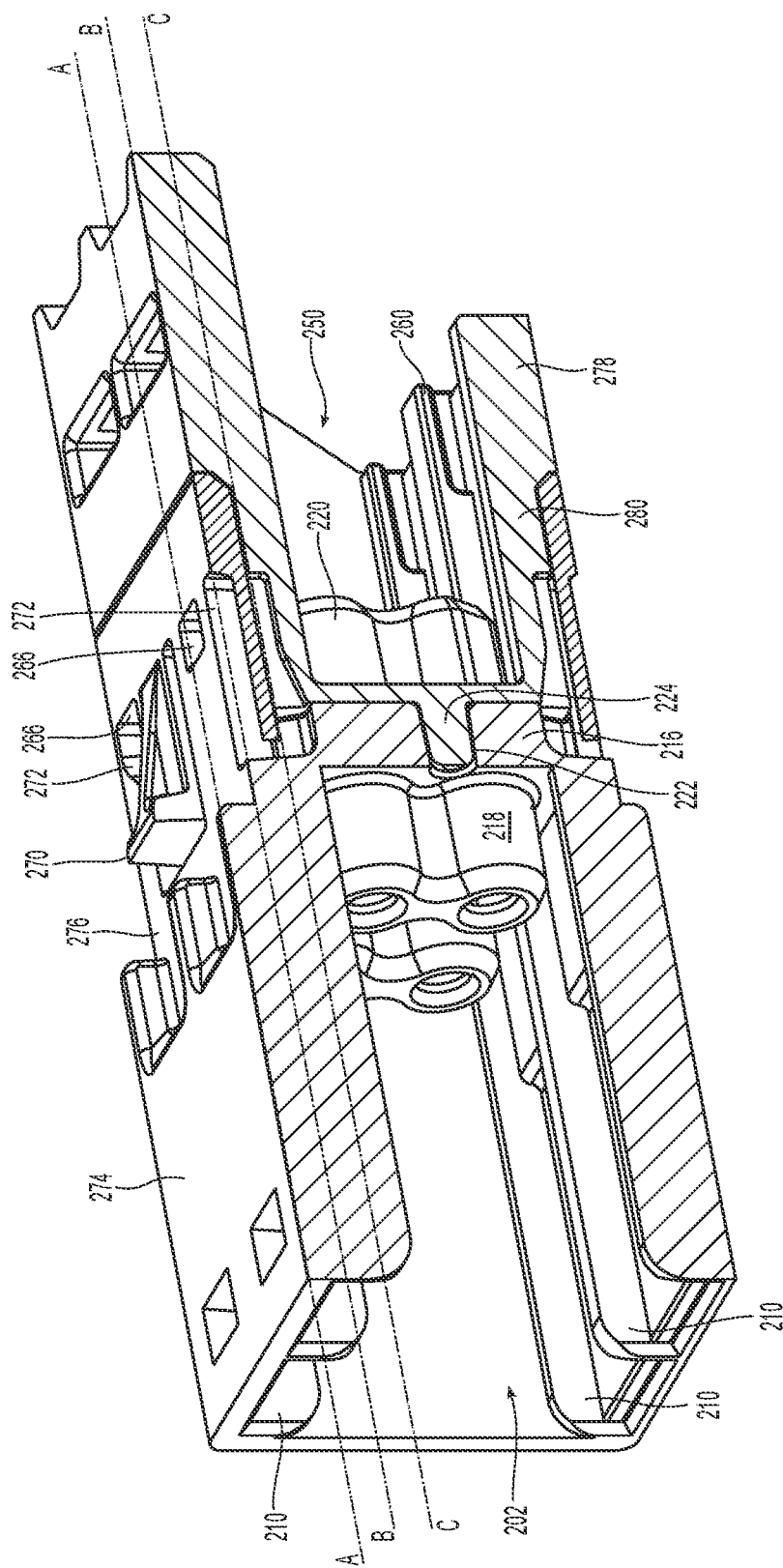
FIG. 9 is a right perspective view of a partial cross section of the two-piece adapter in FIG. 3.
Figure 10:
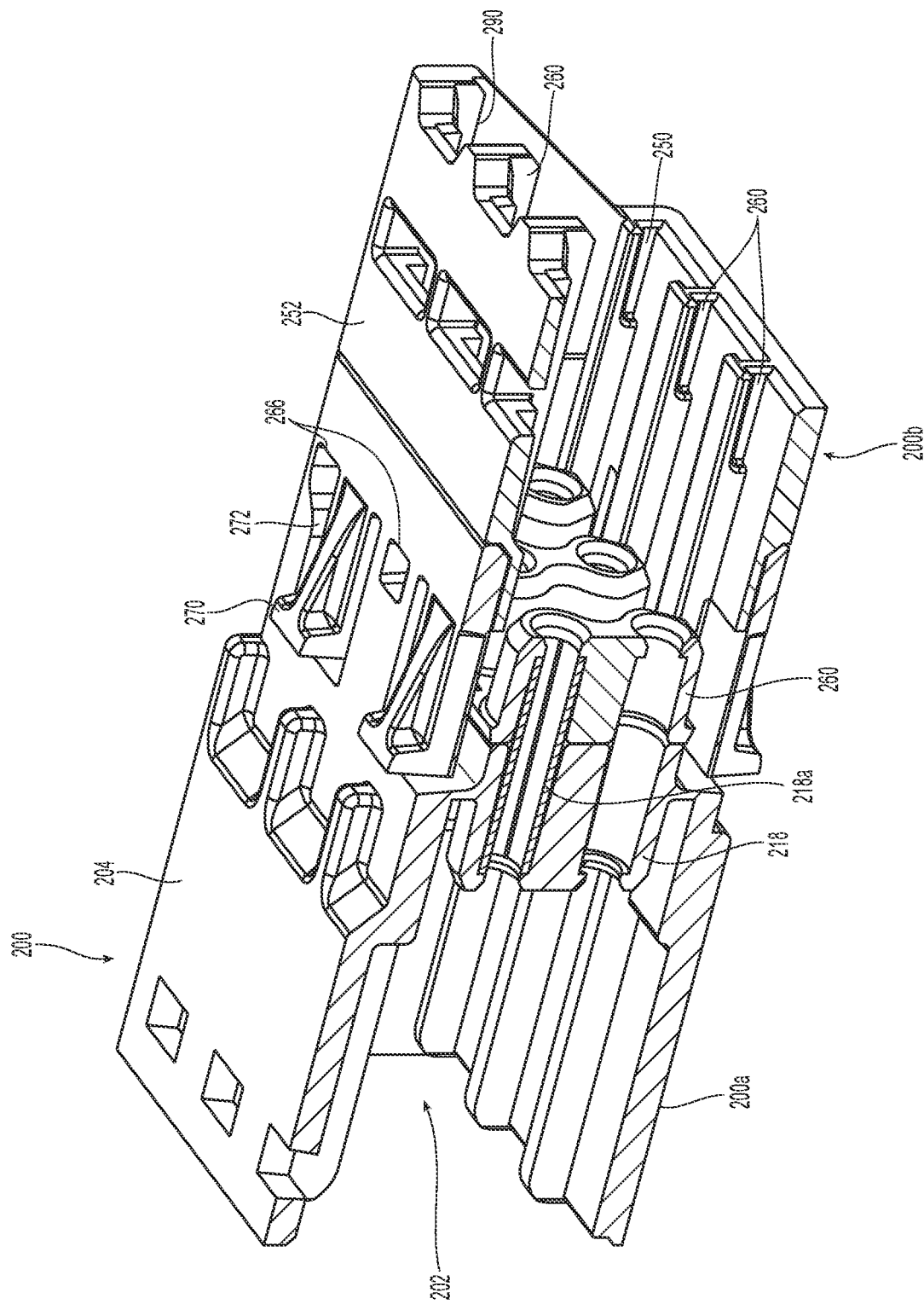
FIG. 10 is a left perspective view of a partial cross section of the two-piece adapter in FIG. 3.

Turning to FIGS. 6 and 7 where the first portion 200a from the front 212 (FIG. 6) and from the rear 214 (FIG. 7) are shown. The first portion 200a has a central partition 216 that divides the first portion 200a into two parts. At the front 212 is the central opening 202, and at the rear 214 is where the second portion 200b is connected to the first portion 200a. See FIGS. 8-10. Extending from the central partition 216 toward the front 212 are a number of fiber optic ferrule openings 218. See also FIGS. 9 and 10. The fiber optic ferrule openings 218 are to receive fiber optic ferrules from the connectors inserted into the central opening 202 and align them with the two-piece fiber optic connectors 100 as explained below. The fiber optic ferrule openings 218 may also be large enough to receive split sleeves (as is known in the art), which in turn then receive the fiber optic ferrules from the fiber optic connectors. These fiber optic ferrule openings 218 will align with similar fiber optic ferrule openings 220 in the second portion 200b, which would also receive the split sleeves if they were used. See, e.g. FIG. 10 showing one split sleeve 218a. Thus, the fiber optic ferrule openings 218,220 ensure alignment of the optical fibers from the opposing fiber optic connectors within the two-piece adapter 200.

The central partition 216 also includes two alignment openings 222, which each receive an alignment post 224 (see e.g., FIG. 8) that is associated with the second portion 200b. Indeed, in FIG. 9, the alignment posts 224 are visible within the alignment openings 222. These two components further ensure that the fiber optic ferrule openings 218 will align with the ferrule openings 220. As can be seen in FIGS. 6 and 7, the alignment openings 222 and the alignment posts 224 are disposed off-center vertically, thereby acting also as a polarity key to ensure that the two portions 200a,200b are connected to one another in the correct orientation. There may be other external polarity features present in addition to or as an alternative to the alignment posts 224 and the alignment openings 222. The central partition 216 also include depressions or openings 230 that provide space within the first portion 200a for latches that are depressed to allow the two-piece adapter 200 to be moved in and out of the fiber optic cassette. This is discussed in more detail below.

Figure 8:
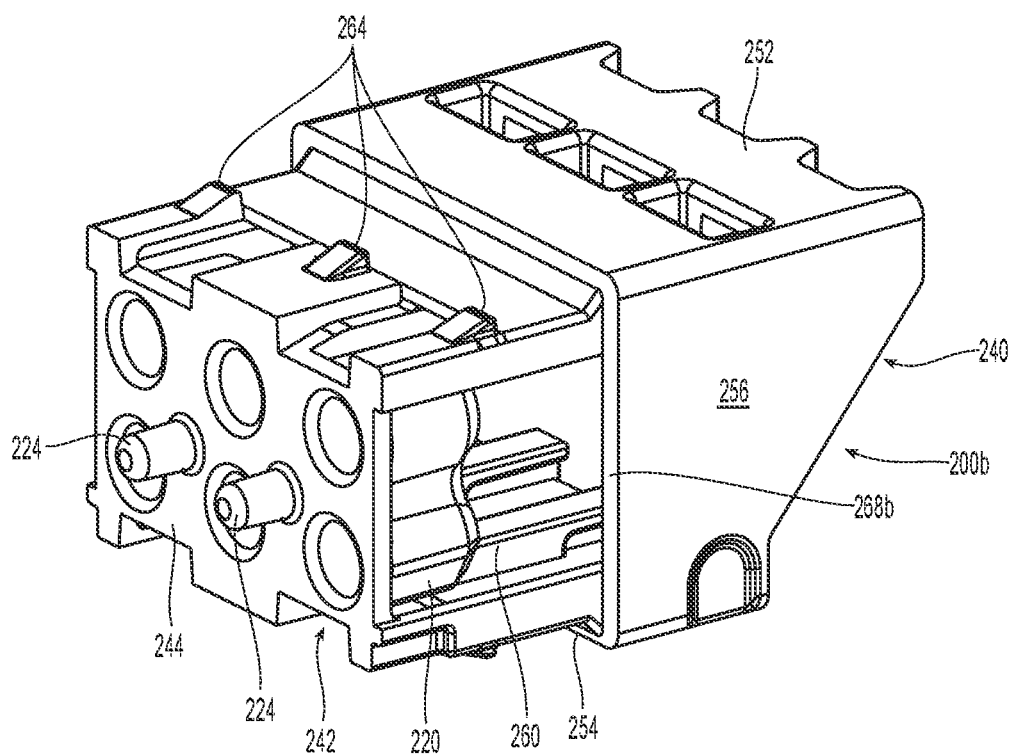
FIG. 8 is a right perspective view of a second portion of the two piece adapter in FIG. 3.

Turing now to FIG. 8, the second portion 200b is illustrated. Second portion 200b has a front end 240 and a rear end 242, with the rear end 242 being inserted into the rear 214 of the first portion 200a. As noted above, the rear end 242 has a wall 244 from which the alignment posts 224 extend to engage the two alignment openings 222 in the central partition 216. Extending from the wall 244 in a direction toward the front end 240 are a plurality of fiber optic ferrule openings 220 that match up to the fiber optic ferrule openings 218 discussed above.

The second portion 200b also has at the front end 240 a central opening 250 to removably receive a plurality of two-piece fiber optic connectors 100. The central opening 250 is formed by a top wall 252, a bottom wall 254, and two side walls 256 that extend from the top wall 252 to the bottom wall 254. Extending into the central opening 250 from the top wall 252 to the bottom wall 254 are a number of alignment projections 260. The alignment projections 260 divide the central opening 250 into thirds and cooperate with alignment shoulders on the plurality of two-piece fiber optic connectors 100 to guide the two-piece fiber optic connectors 100 to the fiber optic ferrule openings 220.

The connection of the first portion 200a to the second portion 200b is achieved by simply pushing the second portion 200b into the first portion 200a. There are a number of detents 264 on second portion 200b towards the rear end 242. The first portion 200a has a corresponding number of windows 266 to receive those detents 264. See FIGS. 5, 9, 10, and 11A. As illustrated, the detents 264 can be on both sides of the second portion 220b and also have corresponding windows 266, or they may only be on one side. The first portion 200a and the second portion 200b are pushed together or relative to one another so that the detents 264 engage the windows 266. The first and second portions 200a,200b each have a wall surface 268a,268b, respectively as shown in FIGS. 7 and 8, that contacts one another when the first and second portions 200a,200b have been properly connected. The wall surface is a portion of the top surface, the bottom surface, and the side walls of the respective first and second portions 200a,200b.

The two-piece adapter 200 also has a number of latches 270 to engage the fiber optic cassette. The latches 270 are illustrated as being four, two on each of the top and bottom of the first portion 200a. The latches 270 are cantilevered and have an opening 272 (see, e.g., FIG. 5) surrounding the latch 270 that extends from outside into the first portion 200b. As noted above, there are depressions or openings 230 (see, e.g., FIG. 7) that provide space for the latches 270 to be pushed into those depressions or openings 230 when the two-piece adapter 200 is inserted into a fiber optic cassette. A portion of the openings 272 near the side walls 208 of the first portion 200a also function as the windows 266 to receive some of the detents 264. It may also be possible to move the latches 270 from the first portion 200a to the second portion 200b.

It is to be noted that there are different portions of the first portion 200a and the second portion 200b. The first portion 200a is divided into a front portion 274 and a rear portion 276 (see, e.g., FIG. 9), while the second portion 200b is divided into front portion 278 and rear portion 280 (see, e.g., FIG. 11A). The front portion 274 has a larger circumference than the rear portion 276. Similarly, the front portion 278 is larger than the rear portion 280. The rear portion 280 is sized to fit into the rear portion 276. Additionally, the front portion 278 has the same circumference as the rear portion 276 of the first portion 200b. As illustrated in FIG. 9, these different sizes mean that the different portions of the first and second portions 200a,200b lie in different planes. The front portion 274 of the first portion 200a lies in a plane A, while the rear portion 274 of first portion 200a and the front portion 276 of second portion 200b lie in the same plane B. The rear portion 278 of the second portion 200a lies in plane C. The larger circumference of the front portion 274 assists in keeping the two-piece adapter 200 from being pulled into the fiber optic cassette.

Illustrated in FIGS. 12-15 is the two-piece fiber optic connector 100, which includes a first portion 100a and a second portion 100b. The two-piece fiber optic connector 100 is a duplex connector, meaning that is has two fiber optic ferrules 102, each of which have a single optical fiber (not illustrated) secured within the fiber optic ferrule 102. The first portion 100a and the second portion 100b could be modified to accept a multi-fiber ferrule as well. The first portion 100a has two passageways 104 that accept the fiber optic ferrule 102 and other components that may be necessary for the protection of the fiber optic ferrule 102 and the optical fiber. For example, there is a ferrule holder 106 that accepts the fiber optic ferrules 102 from a front end 108 of the ferrule holder 106. There may also be a heat shrink tube 110 at the back end of the ferrule holder 106.

Figure 13:
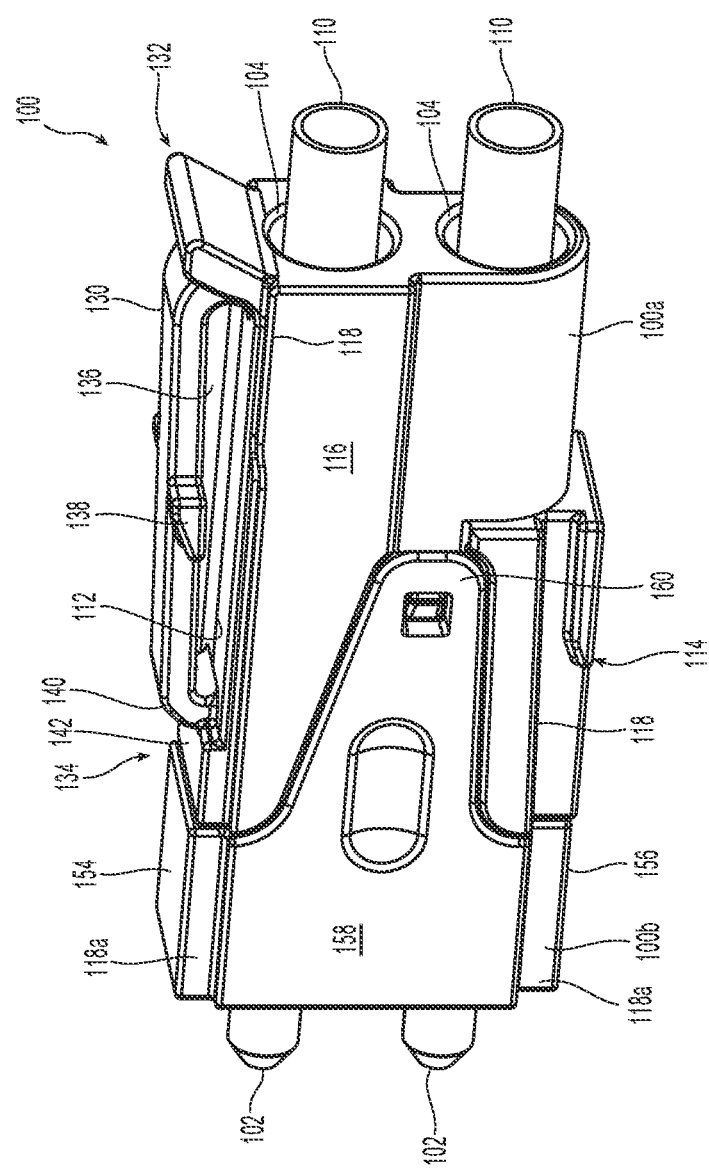
FIG. 13 is a left perspective view of the two-piece fiber optic connector in FIG. 3.

The first portion 100a generally has a top surface 112, a bottom surface 114, and two side surfaces 116 (see, e.g., FIG. 13). As can be seen in the figures, the surfaces do not need to be flat, but they could be. At each of the junctions of the top surface 112 with the side surfaces 116 and at least a portion of where the bottom surface 114 meets the side surfaces 116, there are alignment shoulders 118 (see, e.g., FIG. 12). These alignment shoulders 118 correspond to the alignment projections 260 in the second portion 200b of the two-piece adapter 200. When the alignment shoulders 118 correspond with the alignment projections 260, the fiber optic ferrules 102 align with the alignment projections 260 in the second portion 200b. See, e.g., FIGS. 11A-11C.

The front of the ferrule holder 106 has a hexagonal nut shape with a chamfered surface of the ferrule holder 106. See FIG. 14. The passageways 104 each have a forward facing surface 120 that engages a rearward facing surface 122 of the ferrule holders 106. See, e.g., FIG. 15. There is no spring needed with the two-piece fiber optic connector 100.

The first portion 100a also has an integral latch 130 that engages the second portion 200b of the two-piece adapter 200. The integral latch 130 is formed at the same time and from the same material as the rest of the first portion 100a. The latch 130 preferably starts at the rear end 132 of the second portion 200b of the two-piece adapter 200 and extends toward a distal end or the front end 134. There is a space 136 between the top surface 112 and the underside of the latch 130. The space 136 allows a user to remove the two-piece fiber optic connector 100 from the two-piece adapter 200. The latch 130 can also function as a key to prevent the two-piece fiber optic connector 100 from being inserted into the two-piece adapter 200 incorrectly. The latch 130 also has two latch extensions 138 that engage surfaces in the second portion 200b of the two-piece adapter 200. The front end 140 of the latch 130 is preferably positioned behind a blocking surface 142. As illustrated in FIG. 13, for example, the blocking surface 142 is a part of the top surface 112 on the first portion 100a. The latch 130 is joined to the blocking surface 142 and forms a folded latch at the front end 134 of the two-piece connector 100. Such a joining of the folded integral latch 130 eliminates any chances of snagging of fibers due to an exposed tip of a free hanging latch, as used in conventional LC connectors, for example. In a later embodiment, there is another blocking surface that is on the second portion of the fiber optic connector. Alternatively, the latch 130 may be secured to the top surface 112 of the first portion 100a.

Returning to FIGS. 11A-11C, the function of the latch 130, the keying function of the latch 130 and the positioning of the two latch extensions 138 will be discussed. The second portion 200b of the two-piece adapter 200 has in the top of the central opening 250 a groove 290 between the alignment projections 260 to receive the latch 130. There is no corresponding groove in the bottom of the central opening 250, thereby preventing a user from inserting the two-piece fiber optic connector 100 into the two-piece adapter 200 incorrectly. The top wall 204 also has three windows 292 that are aligned with the groove 290 to receive the two latch extensions 138 when the two-piece fiber optic connector 100 is inserted correctly. There is a break 294 in the alignment projections 260 in the second portion 200b, thereby making a surface 296 against which the two latch extensions 138 will engage to prevent the two-piece fiber optic connector 100 from being removed accidentally. The user may press on the latch 130 to release the two latch extensions 138, press on the latch 130 through the windows 292, or press on the top surface of the latch 130 or a tab thereon to depress the latch 130, shortening the space 136.

Figure 11A:
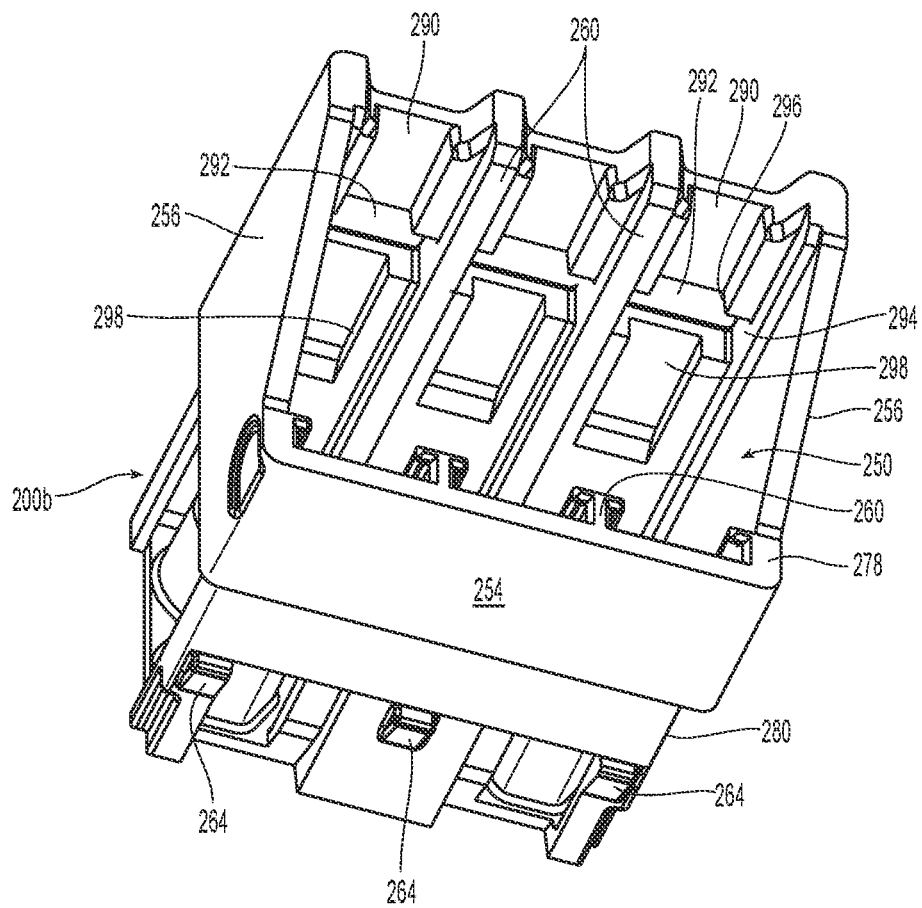
FIG. 11A is a perspective view from the bottom side into the second portion of the two-piece adapter in FIG. 3.
Figure 11B:
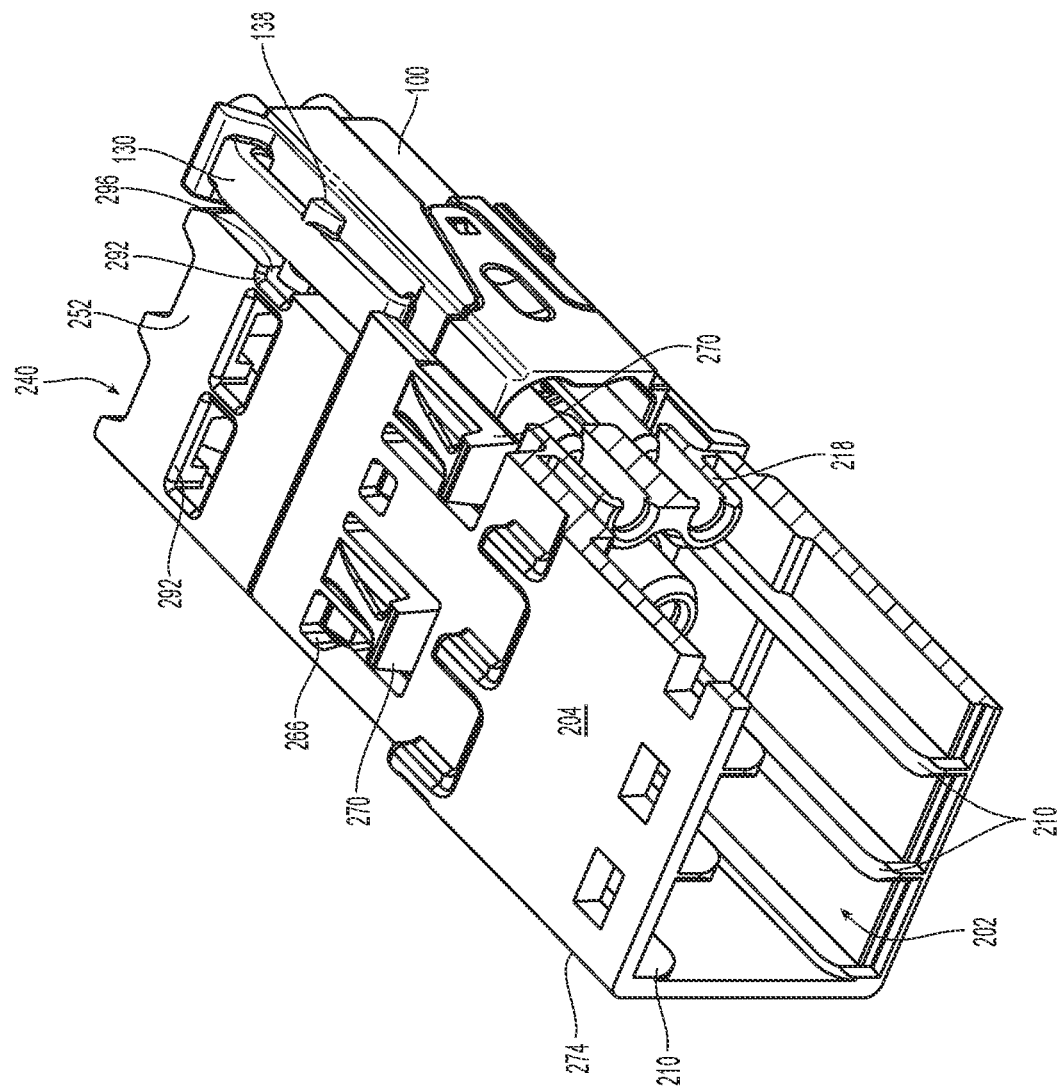
FIG. 11B is a right perspective view of a partial cross section of the two-piece adapter with the two-piece fiber optic connector inserted therein.

The folded latch design of the latch 130 provides the advantage of controlling only a single dimension from where the latch 130 joins the blocking surface 142 to the rearward facing surface 122 of the ferrule holders 106 with respect to the rear piece of the connector to properly seat the ferrule, as shown in FIG. 11B. As a result, since there is only one dimension that needs to be controlled with respect to the ferrule positioning, and stacking of tolerances is not an issue with the design of this small form-factor two-piece connector 100.

Figure 11C:
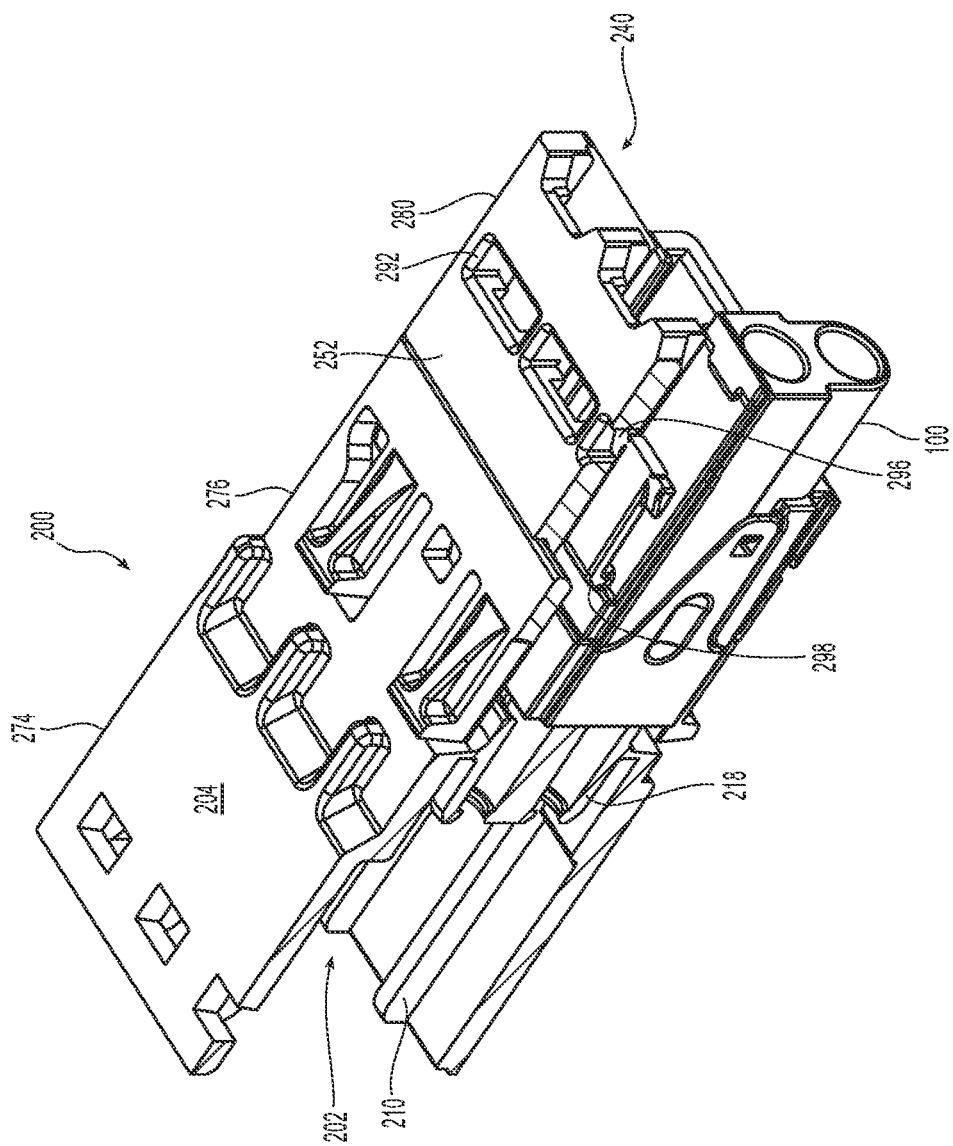
FIG. 11C is a rear perspective view of a partial cross section of the two-piece adapter with the two-piece fiber optic connector inserted therein.
Figure 12:
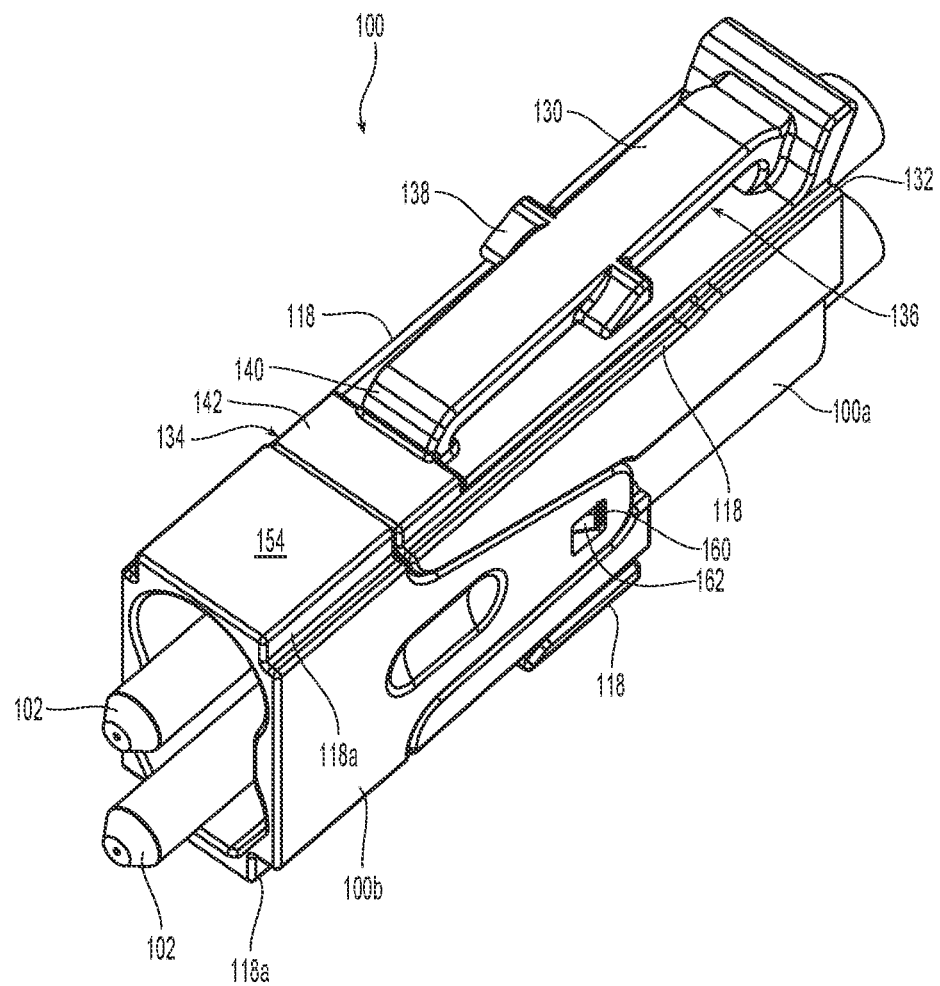
FIG. 12 is a top left perspective view of the two-piece fiber optic connector in FIG. 3.

As best viewed in FIG. 11C, there is a continuation of the groove, a portion 298 that receives the front end 140 of the latch 130.

Figure 14:
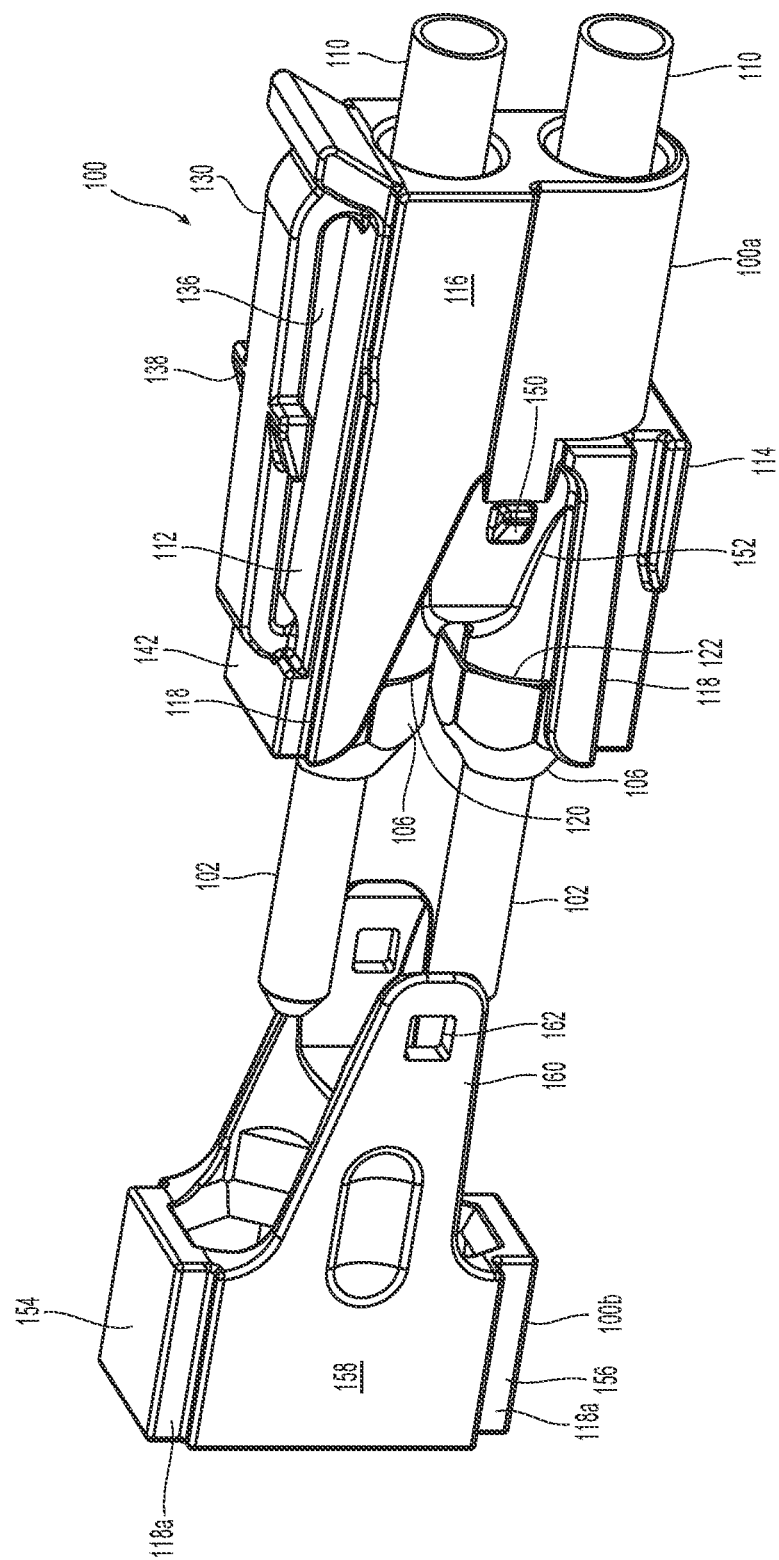
FIG. 14 is a left perspective exploded view of the two-piece fiber optic connector in FIG. 3.
Figure 15:
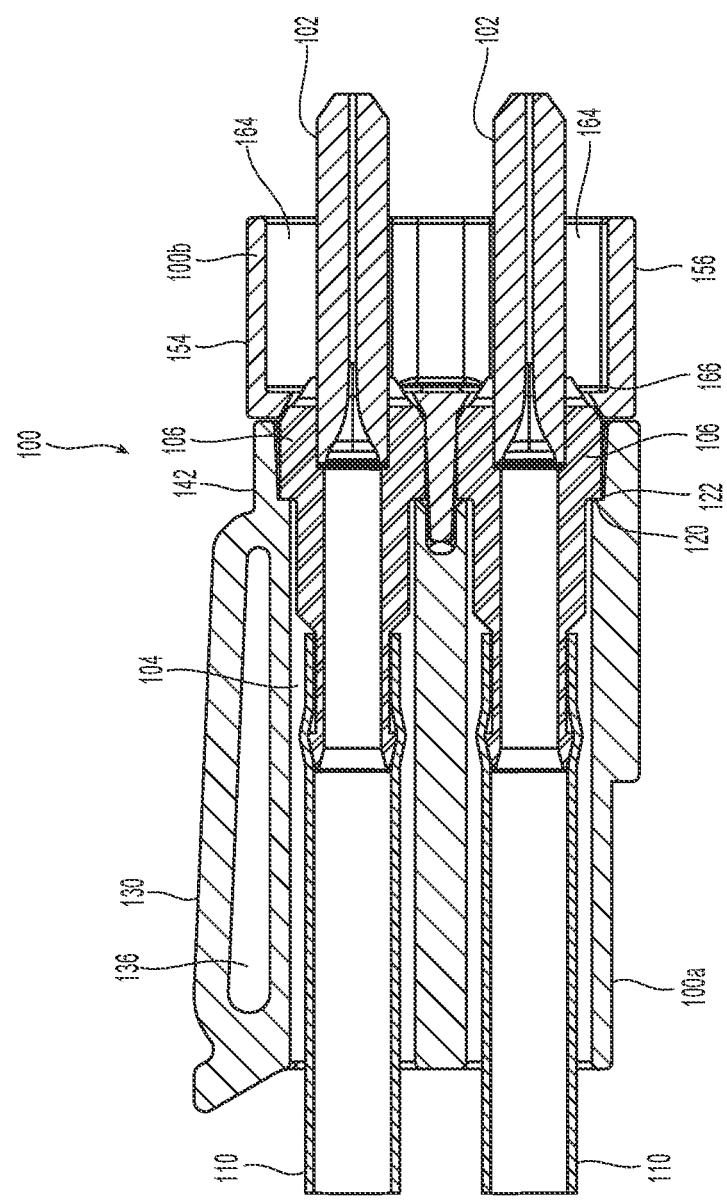
FIG. 15 is a cross section of the two-piece fiber optic connector in FIG. 3.
Figure 16:
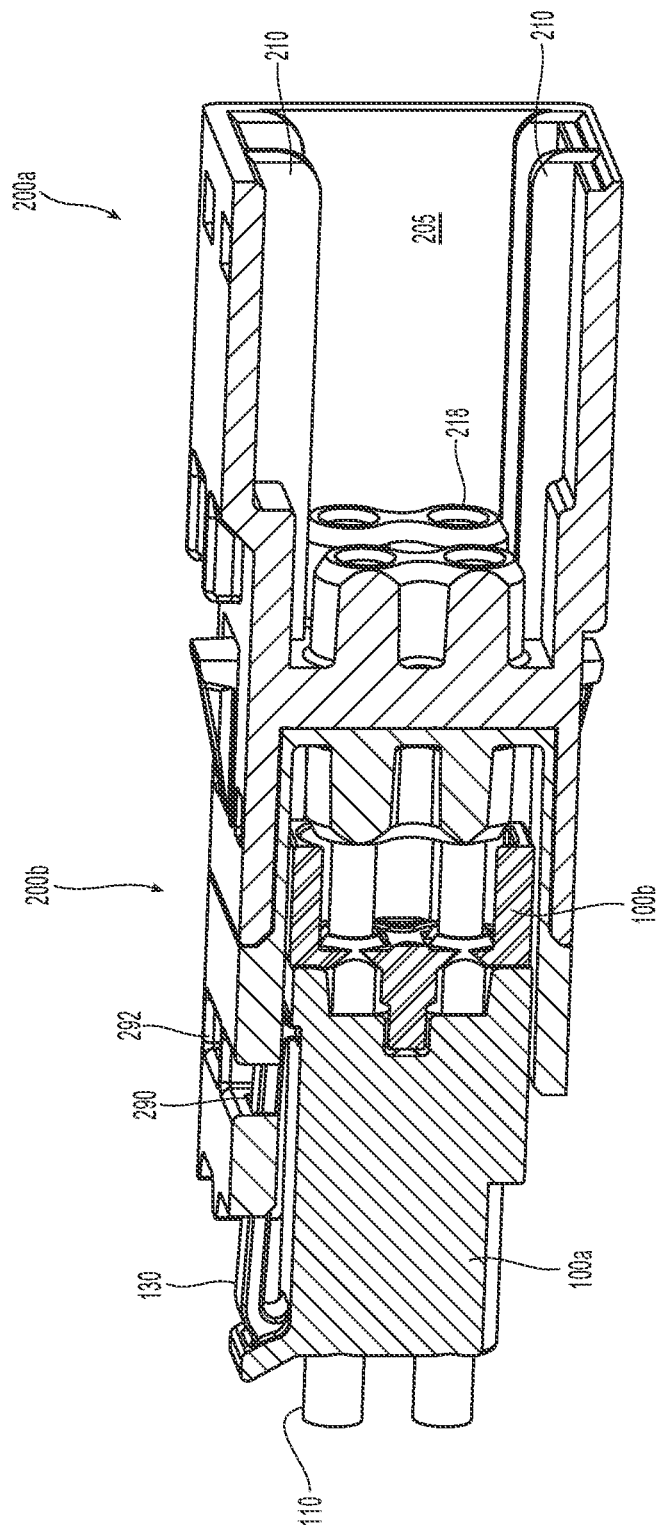
FIG. 16 is a cross section of the two-piece fiber optic connector and the two-piece adapter in FIG. 3.

The first portion 100a also has two side latches 150 that correspond to side latch windows on the second portion 100b. As best seen in FIG. 14, the two side surfaces 116 are not smooth, but have a contour 152 that protects the two side latches 150. While the first portion 100a and the second portion 100b attach to each other via the side latches 150, one of ordinary skill in view of this disclosure will appreciate that the first portion 100a and the second portion 100b may be attached to each other by other means, for example, by latches 150 being moved to the top surface 112 and the bottom surface 114, with corresponding windows on the second portion 100b. Yet alternatively, only a single side latch 150 is possible.

The second portion 100b has a top surface 154, a bottom surface 156, and two side surfaces 158 with tabs 160 that extend along the side surfaces 116 of the first portion 100b. The second portion 100b also has the alignment shoulders 118a that are a continuation of the alignment shoulders 118 of the first portion 100a. The tabs 160 have side latch windows 162 that receive one of the two side latches 150 to secure the first portion 100a to the second portion 100b.

Figure 17:
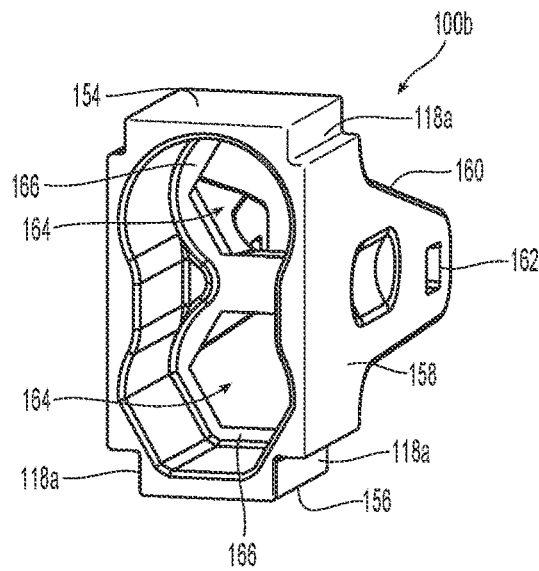
FIG. 17 is a front perspective view of a second portion of the two-piece fiber optic connector in FIG. 12.
Figure 18:
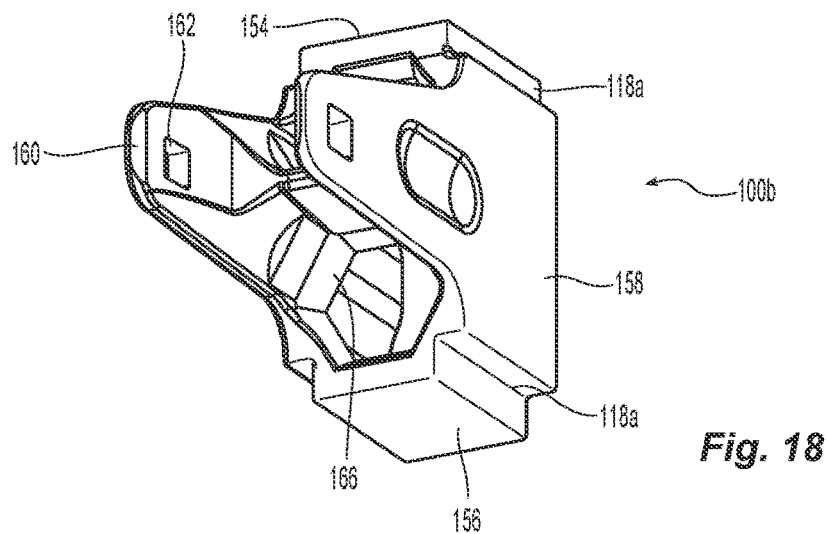
FIG. 18 is a rear perspective view of a second portion of the two-piece fiber optic connector in FIG. 12.
Figure 19:
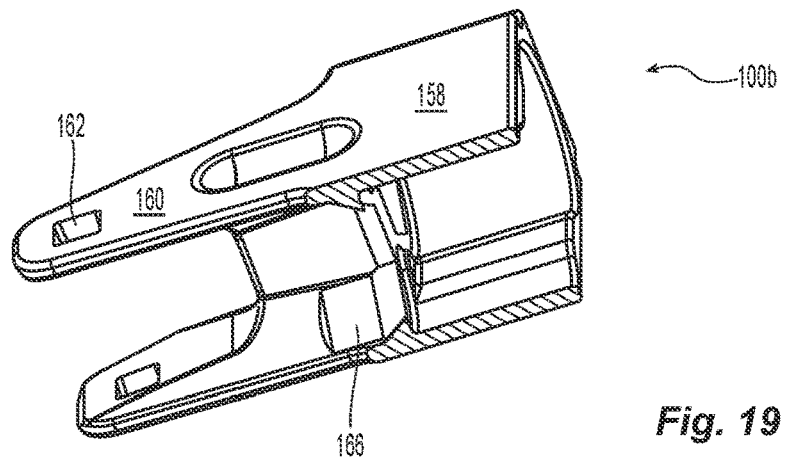
FIG. 19 is a partial cross section view of the second portion of the two-piece fiber optic connector from the bottom side.

The second portion 100b has two passageways 164 (e.g., in FIG. 15) to receive the fiber optic ferrules 102 and a front end 108 of the ferrule holder 106. The passageways 164 include a portion 166 that have the configuration of the hexagonal nut portion of the ferrule holder 106. See, e.g., FIGS. 17-19. Thus, the ferrule holder 106 engages the portion 166 (in particular the chamfered portion) to prevent the ferrule holder 106 from extending beyond the portion 166.

Figure 20:
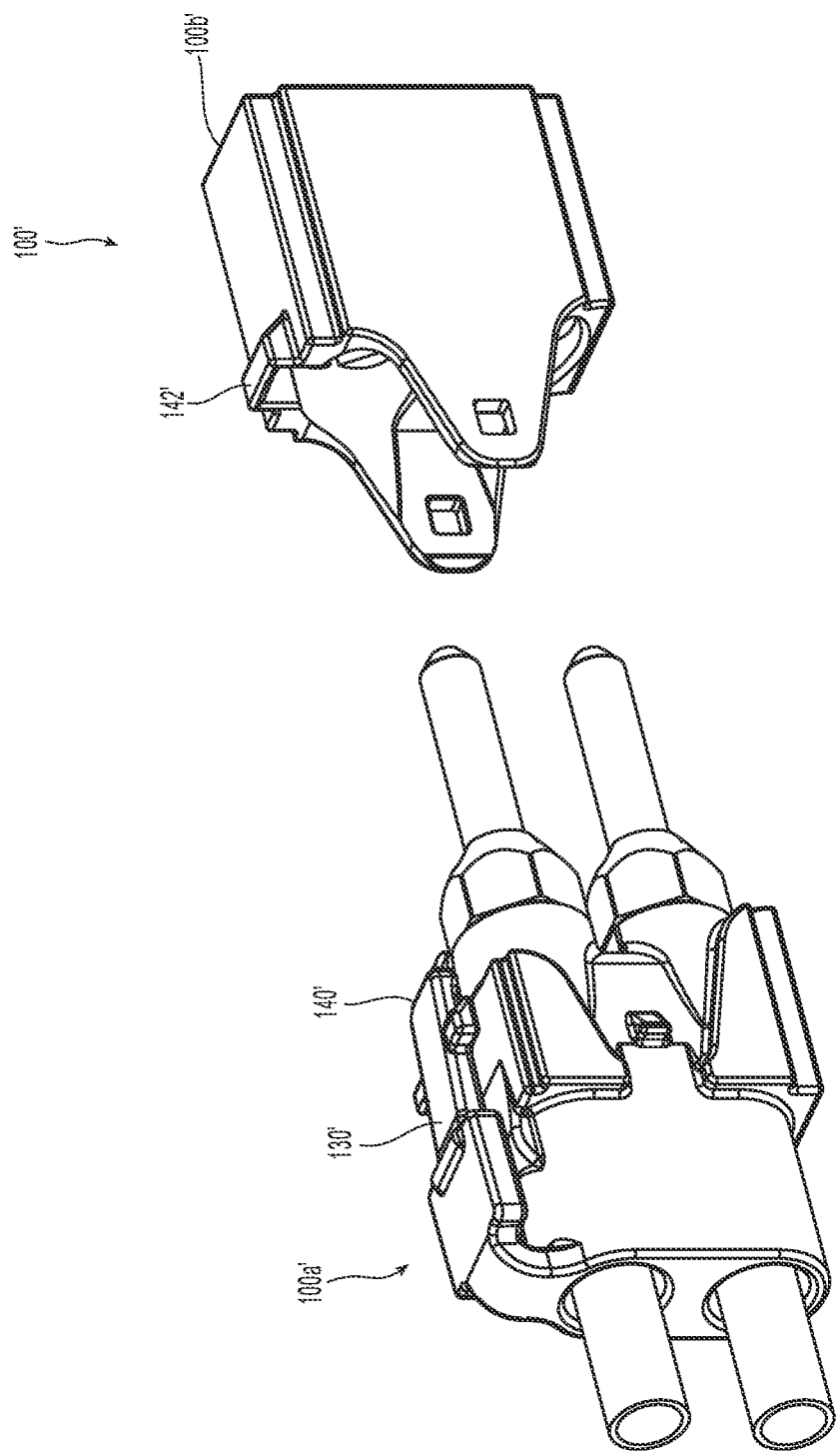
FIG. 20 is a right side perspective view of an exploded second embodiment of a two-piece fiber optic connector according to the present invention.

A second embodiment of a two-piece fiber optic connector 100' is illustrated in FIG. 20. The majority of the two-piece fiber optic connector 100' is similar to that described in detail above and will not be addressed again here. However, the two-piece fiber optic connector 100' has a different latch 130' and a different front end 140'. The front end 140' of the latch 130' is separated from the remainder of the first portion 100a'. The second portion 100b' has a latch pocket 142' that functions as the blocking surface in this embodiment. The latch pocket 142' prevents the latch 130' from snagging other connectors, adapters, and optical fibers once the first portion 100a' and the second portion 100b' have been attached.

Figure 21:
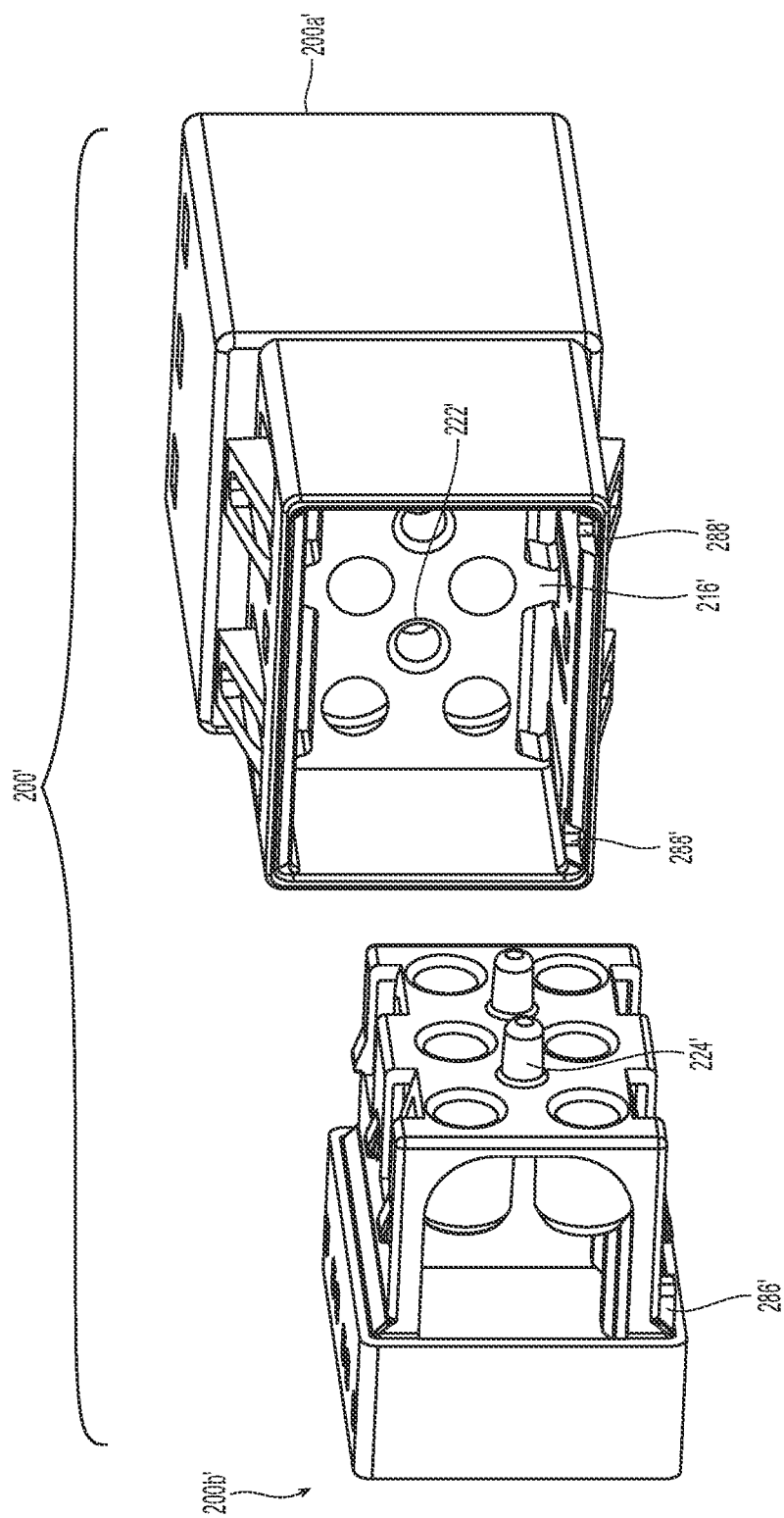
FIG. 21 is a right side perspective view of an exploded second embodiment of a two-piece adapter according to the present invention.

A second embodiment of a two-piece adapter 200' is illustrated in FIG. 21. This adapter 200' can be used with the two-piece fiber optic connector 100' in FIG. 20. One of the main differences in this embodiment, is that the alignment posts 224' and the alignment openings 222' are in the center of the central partitions 216' and therefore do not provide a keying feature. However the second portion 200b has two polarity keys 286' and the first portion 200a has two polarity slots 288' to ensure the correct assembly of the two-piece adapter 200'.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:
1. An adapter for mating fiber optic connectors comprising:
a main body having a first, front end portion and a second end portion spaced apart along a longitudinal axis, the main body comprising a first side wall and a second side wall spaced apart along a lateral axis perpendicular to the longitudinal axis, wherein the main body has a width extending along the lateral axis from the first side wall to the second side wall, wherein the main body comprises an upper wall and a lower wall spaced apart along a transverse axis oriented perpendicular to the lateral axis and perpendicular to the longitudinal axis, each of the upper wall and the lower wall having an inner surface, wherein the main body defines a first plurality of channels spaced apart along the width, each of the first plurality of channels being configured to respectively receive an optical fiber connector having two ferrules from the first, front end portion into the main body, wherein the main body further comprises a second plurality of channels spaced apart along the width at the second end portion, each of the second plurality of channels being configured to respectively receive an additional optical fiber connector also having two ferrules from the second end portion into the main body, wherein the first plurality of channels and the second plurality of channels are aligned along the longitudinal axis;

a central portion inside the main body between the first, front end portion and the second end portion along the longitudinal axis and comprising two ferrule openings for each of the first plurality of channels and the second plurality of channels, wherein the two ferrule openings for each of the first plurality of channels and the second plurality of channels are arranged spaced-apart along the transverse axis; and a first divider between two channels of the first plurality of channels, the first divider extending toward the central portion from the first, front end portion, the first divider defining a notch at the first, front end portion thereof that is adjacent the lower wall to receive a laterally extending projection of the optical fiber connector, wherein a portion of the first divider is located above the notch along the transverse axis.

2. The adapter of claim 1, wherein the first divider and the notch is on the lower wall of the main body.

3. The adapter of claim 2, wherein the laterally extending projection of the optical fiber connector is on a lower portion thereof.

4. The adapter of claim 2, wherein the laterally extending projection of the optical fiber connector is on a lower portion thereof.

5. The adapter of claim 1, further comprising:
a latch receptacle for each of the first plurality of channels and for each of the second plurality of channels to respectively receive a latch from the optical fiber connector and a latch from the additional optical fiber connector.

6. The adapter of claim 5, wherein the latch receptacle for each of the first plurality of channels is on the upper wall and the latch receptacle for each of the second plurality of channels is also on the upper wall.

7. The adapter of claim 5, wherein the latch receptacle for each of the first plurality of channels is on the upper wall and the latch receptacle for each of the second plurality of channels is also on the upper wall.

8. The adapter of claim 1, wherein the two ferrule openings receive sleeves to respectively receive the two ferrules for each of the first plurality of channels.

9. The adapter of claim 1, wherein the first plurality of channels includes at least two channels.

10. The adapter of claim 1, wherein the second plurality of channels includes at least two channels.

11. The adapter of claim 1, wherein the first plurality of channels includes at least two channels and wherein the second plurality of channels includes at least two channels.

12. The adapter of claim 11, wherein the at least two channels of the first plurality of channels are four channels and wherein the at least two channels of the second plurality of channels are four channels.

13. The adapter of claim 11, wherein the at least two channels of the first plurality of channels are four channels and wherein the at least two channels of the second plurality of channels are four channels.

14. The adapter of claim 1, wherein the first divider with the at least one receptacle is on the lower wall of the main body.

15. The adapter of claim 1, further comprising:
a latch receptacle for each of the first plurality of channels and for each of the second plurality of channels to respectively receive a latch from the optical fiber connector and a latch from the additional optical fiber connector.

16. The adapter of claim 1, wherein the at least one ferrule opening receives a sleeve to receive the at least one ferrule for each of the first plurality of channels.

17. The adapter of claim 1, wherein the first plurality of channels includes at least two channels.

18. The adapter of claim 1, wherein the second plurality of channels includes at least two channels.

19. The adapter of claim 1, wherein the first plurality of channels includes at least two channels and wherein the second plurality of channels includes at least two channels.

20. An adapter for mating fiber optic connectors comprising:
a main body having a first, front end portion and a second end portion spaced apart along a longitudinal axis, the main body comprising a first side wall and a second side wall spaced apart along a lateral axis perpendicular to the longitudinal axis, wherein the main body has a width extending along the lateral axis from the first side wall to the second side wall, wherein the main body comprises an upper wall and a lower wall spaced apart along a transverse axis oriented perpendicular to the lateral axis and perpendicular to the longitudinal axis, each of the upper wall and the lower wall having an inner surface, wherein the main body defines a first plurality of channels spaced apart along the width, each of the first plurality of channels being configured to respectively receive an optical fiber connector having at least one ferrule from the first, front end portion into the main body, wherein the main body further comprises a second plurality of channels spaced apart along the width at the second end portion, each of the second plurality of channels being configured to respectively receive an additional optical fiber connector also having at least one ferrule from the second end portion into the main body, wherein the first plurality of channels and the second plurality of channels are aligned along the longitudinal axis;

a central portion inside the main body between the first, front end portion and the second end portion along the longitudinal axis and comprising at least one ferrule opening for each of the first plurality of channels and the second plurality of channels, wherein the two ferrule openings for each of the first plurality of channels and the second plurality of channels are arranged spaced-apart along the transverse axis; and a first divider between two channels of the first plurality of channels, the first divider extending toward the central portion from the first, front end portion, the first divider defining a notch at the front end portion thereof that is adjacent the lower wall to receive a laterally extending projection of the optical fiber connector, wherein a portion of the first divider is located above the notch along the transverse axis.

\* \* \* \* \*

UNITED STATES PATENT AND TRADEMARK OFFICE
CERTIFICATE OF CORRECTION

PATENT NO. : 11,940,654 B2
APPLICATION NO. : 18/456105
DATED : March 26, 2024
INVENTOR(S) : Jason Higley and Darrell R. Childers It is certified that error appears in the above-identified patent and that said Letters Patent is hereby corrected as shown below:

In the Claims

Please replace all Claims 1-20 of Column 8, Line 61 to Column 11, Line 10 with the following claims:

What is claimed:

1. An adapter for mating fiber optic connectors comprising:
    a main body having a first, front end portion and a second end portion spaced apart along a longitudinal axis, the main body comprising a first side wall and a second side wall spaced apart along a lateral axis perpendicular to the longitudinal axis,
    wherein the main body has a width extending along the lateral axis from the first side wall to the second side wall,
    wherein the main body comprises an upper wall and a lower wall spaced apart along a transverse axis oriented perpendicular to the lateral axis and perpendicular to the longitudinal axis, each of the upper wall and the lower wall having an inner surface,
    wherein the main body defines a first plurality of channels spaced apart along the width, each of the first plurality of channels being configured to respectively receive an optical fiber connector having two ferrules from the first, front end portion into the main body,
    wherein the main body further comprises a second plurality of channels spaced apart along the width at the second end portion, each of the second plurality of channels being configured to respectively receive an additional optical fiber connector also having two ferrules from the second end portion into the main body,
    wherein the first plurality of channels and the second plurality of channels are aligned along the longitudinal axis;
    a central portion inside the main body between the first, front end portion and the second end portion along the longitudinal axis and comprising two ferrule openings for each of the first plurality of channels and the second plurality of channels, wherein the two ferrule openings for each of the first plurality of channels and the second plurality of channels are arranged spaced-apart along the transverse axis; and
    a first divider between two channels of the first plurality of channels, the first divider Signed and Sealed this
Seventeenth Day of September, 2024

*Katherine Kelly Vidal*
Director of the United States Patent and Trademark Office extending toward the central portion from the first, front end portion, the first divider defining a notch at the first, front end portion thereof that is adjacent the lower wall to receive a laterally extending projection of the optical fiber connector, wherein a portion of the first divider is located above the notch along the transverse axis.

2. The adapter of claim 1, wherein the first divider and the notch is on the lower wall of the main body.

3. The adapter of claim 2, wherein the laterally extending projection of the optical fiber connector is on a lower portion thereof.

4. The adapter of claim 1, further comprising:
 a latch receptacle for each of the first plurality of channels and for each of the second plurality of channels to respectively receive a latch from the optical fiber connector and a latch from the additional optical fiber connector.

5. The adapter of claim 4, wherein the latch receptacle for each of the first plurality of channels is on the upper wall and the latch receptacle for each of the second plurality of channels is also on the upper wall.

6. The adapter of claim 1, wherein the two ferrule openings receive sleeves to respectively receive the two ferrules for each of the first plurality of channels.

7. The adapter of claim 1, wherein the first plurality of channels includes at least two channels.

8. The adapter of claim 1, wherein the second plurality of channels includes at least two channels.

9. The adapter of claim 1, wherein the first plurality of channels includes at least two channels and wherein the second plurality of channels includes at least two channels.

10. The adapter of claim 9, wherein the at least two channels of the first plurality of channels are four channels and wherein the at least two channels of the second plurality of channels are four channels.

11. An adapter for mating fiber optic connectors comprising:
 a main body having a first, front end portion and a second end portion spaced apart along a longitudinal axis, the main body comprising a first side wall and a second side wall spaced apart along a lateral axis perpendicular to the longitudinal axis,
 wherein the main body has a width extending along the lateral axis from the first side wall to the second side wall,
 wherein the main body comprises an upper wall and a lower wall spaced apart along a transverse axis oriented perpendicular to the lateral axis and perpendicular to the longitudinal axis, each of the upper wall and the lower wall having an inner surface,
 wherein the main body defines a first plurality of channels spaced apart along the width, each of the first plurality of channels being configured to respectively receive an optical fiber connector having at least one ferrule from the first, front end portion into the main body,
 wherein the main body further comprises a second plurality of channels spaced apart along the width at the second end portion, each of the second plurality of channels being configured to respectively receive an additional optical fiber connector also having at least one ferrule from the second end portion into the main body, wherein the first plurality of channels and the second plurality of channels are aligned along the longitudinal axis;

a central portion inside the main body between the first, front end portion and the second end portion along the longitudinal axis and comprising at least one ferrule opening for each of the first plurality of channels and the second plurality of channels, wherein the two ferrule openings for each of the first plurality of channels and the second plurality of channels are arranged spaced-apart along the transverse axis; and a first divider between two channels of the first plurality of channels, the first divider extending toward the central portion from the first, front end portion, the first divider defining a notch at the front end portion thereof that is adjacent the lower wall to receive a laterally extending projection of the optical fiber connector, wherein a portion of the first divider is located above the notch along the transverse axis.

12. The adapter of claim 11, wherein the first divider with the at least one receptacle is on the lower wall of the main body.

13. The adapter of claim 12, wherein the laterally extending projection of the optical fiber connector is on a lower portion thereof.

14. The adapter of claim 11, further comprising:
    a latch receptacle for each of the first plurality of channels and for each of the second plurality of channels to respectively receive a latch from the optical fiber connector and a latch from the additional optical fiber connector.

15. The adapter of claim 14, wherein the latch receptacle for each of the first plurality of channels is on the upper wall and the latch receptacle for each of the second plurality of channels is also on the upper wall.

16. The adapter of claim 11, wherein the at least one ferrule opening receives a sleeve to receive the at least one ferrule for each of the first plurality of channels.

17. The adapter of claim 11, wherein the first plurality of channels includes at least two channels.

18. The adapter of claim 11, wherein the second plurality of channels includes at least two channels.

19. The adapter of claim 11, wherein the first plurality of channels includes at least two channels and wherein the second plurality of channels includes at least two channels.

20. The adapter of claim 19, wherein the at least two channels of the first plurality of channels are four channels and wherein the at least two channels of the second plurality of channels are four channels.